(No Model.) 5 Sheets—Sheet 3.
J. E. BERING.
CORN PLANTER.
No. 473,413. Patented Apr. 19, 1892.
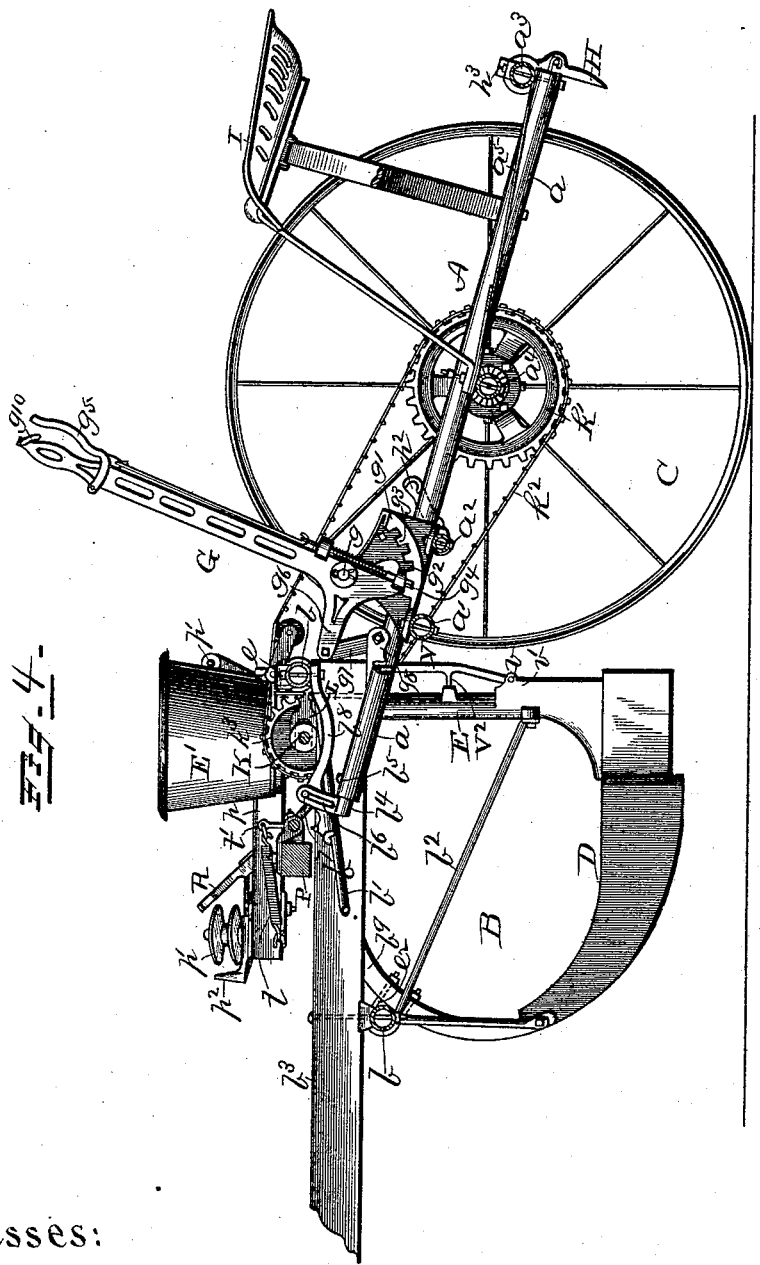
Witnesses:
Arthur E. Durand
H. M. Richards.
Inventor:
James Edward Bering,
By W. B. Richards
Atty.

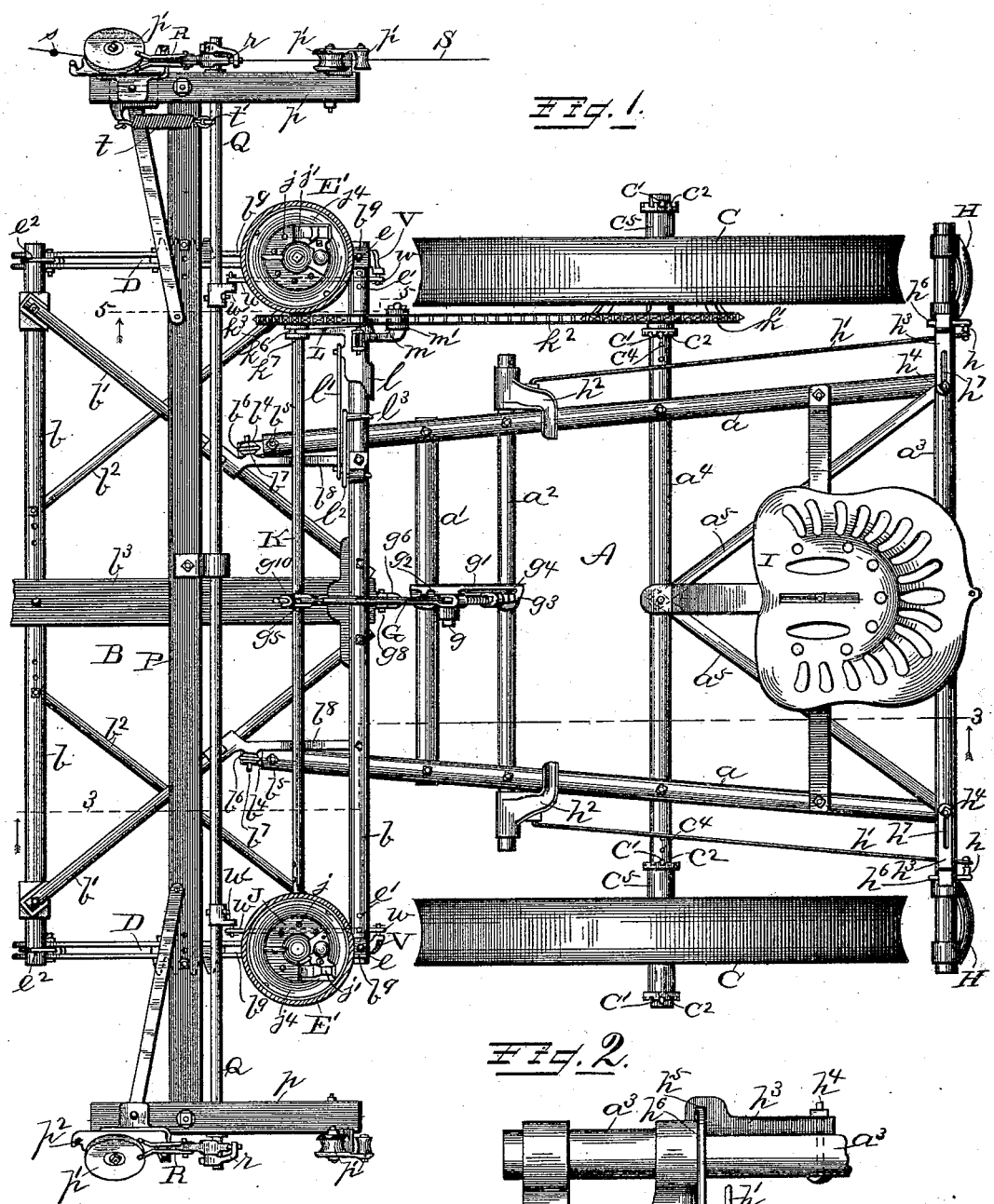

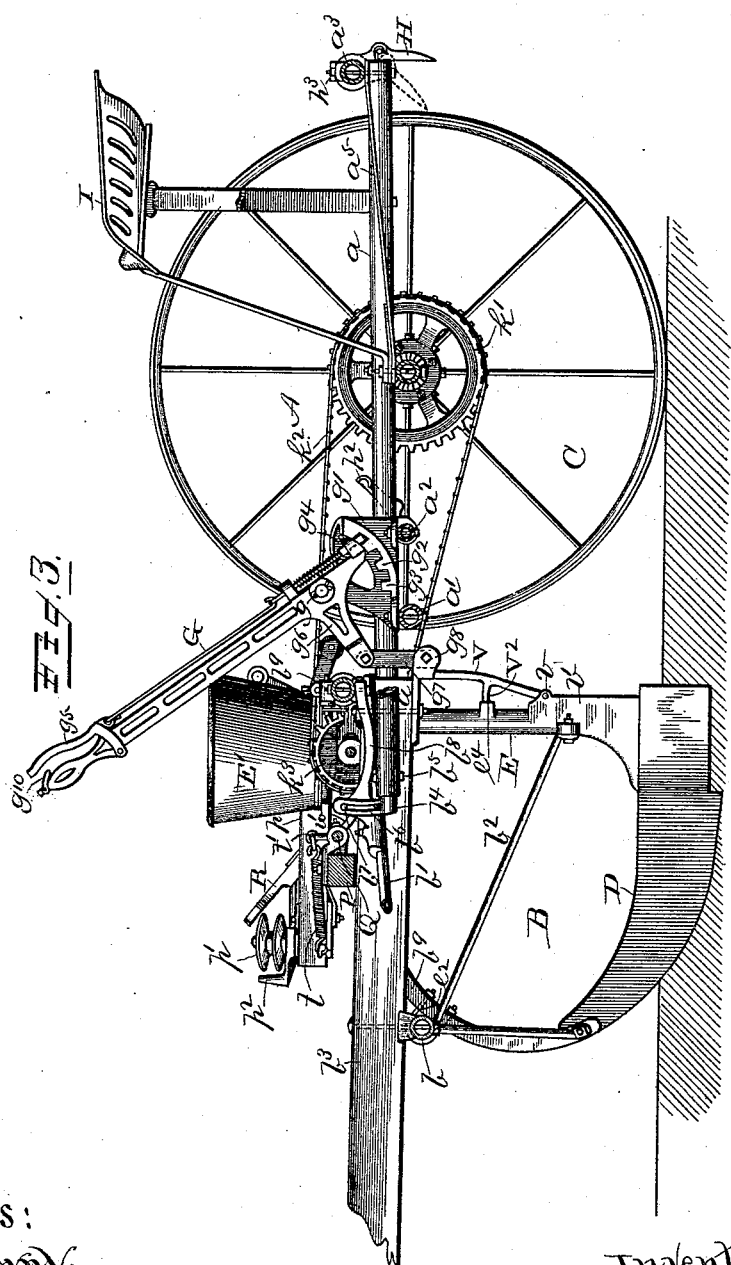

(No Model.) 5 Sheets—Sheet 4.
J. E. BERING.
CORN PLANTER.
No. 473,413. Patented Apr. 19, 1892.
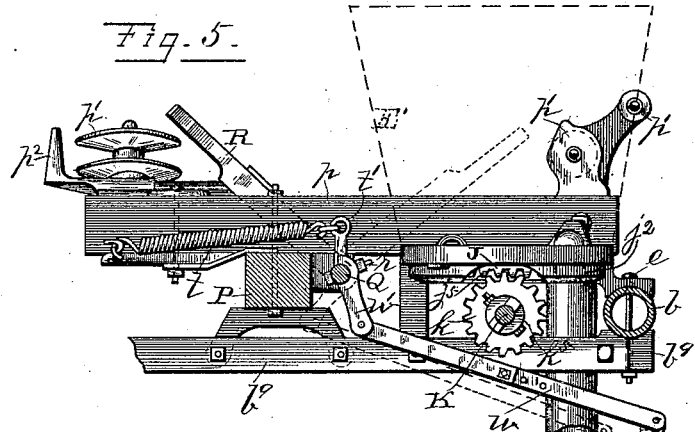
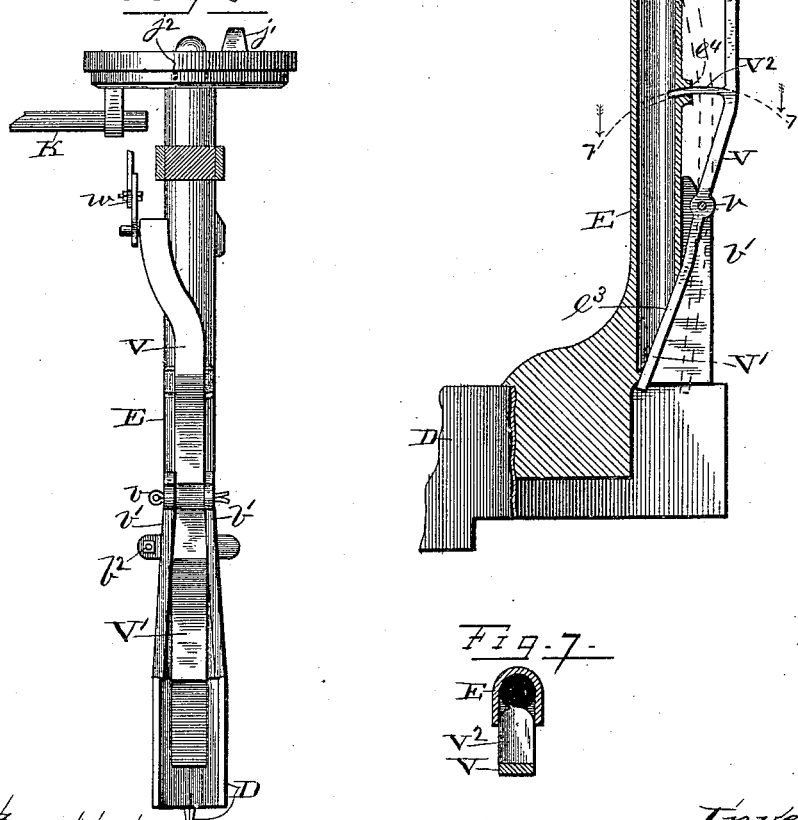
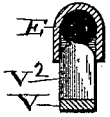
Witnesses:
Inventor:
James Edw. Bering,
By W. B. Richards,
Atty.

(No Model.)  5 Sheets—Sheet 5.
J. E. BERING.
CORN PLANTER.
No. 473,413.  Patented Apr. 19, 1892.
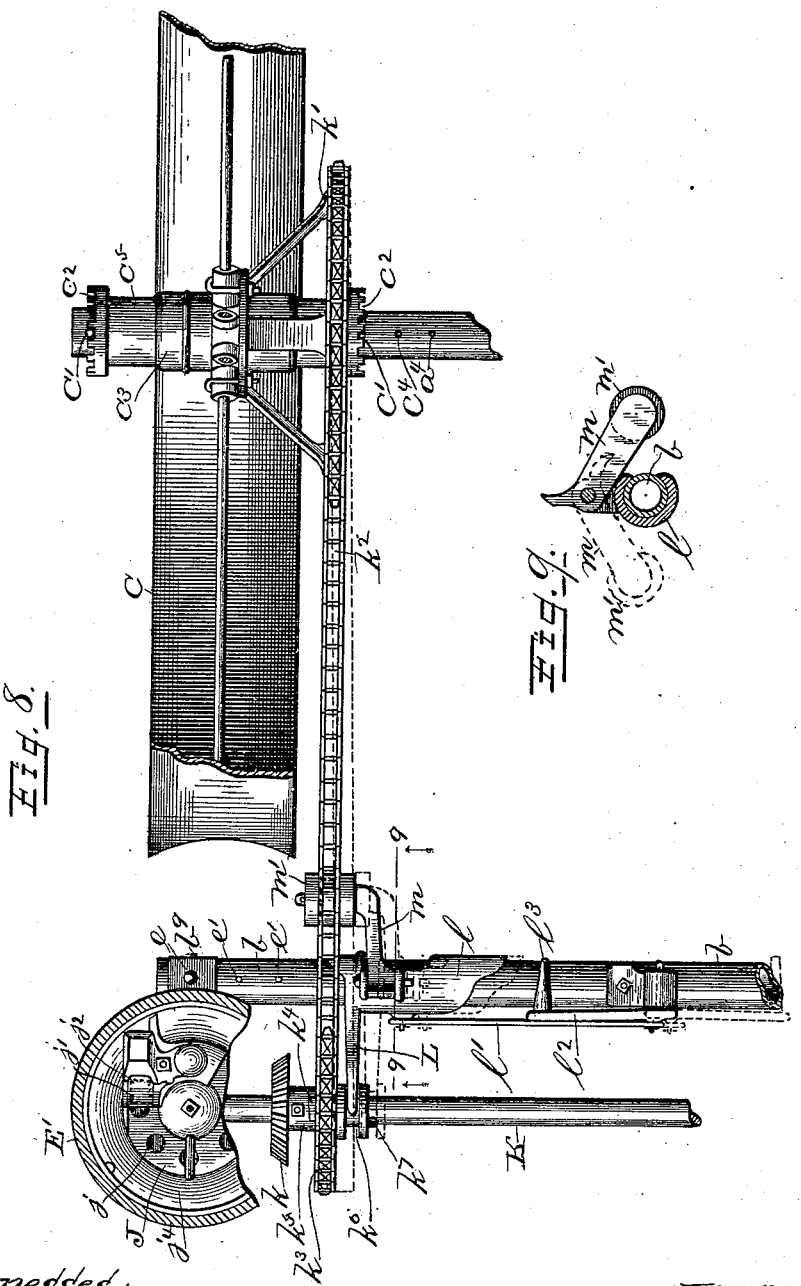
Witnesses:
Arthur T Marshall
H. M. Richards.
Inventor:
James Edwd Bering,
By W. B. Richards,
Atty.

UNITED STATES PATENT OFFICE.

JAMES EDWARD BERING, OF DECATUR, ILLINOIS, ASSIGNOR TO THE CHAMBERS, BERING, QUINLAN COMPANY, OF SAME PLACE.

CORN-PLANTER.

SPECIFICATION forming part of Letters Patent No. 473,413, dated April 19, 1892.

Application filed January 28, 1892. Serial No. 419,528. (No model.)

*To all whom it may concern:*

Be it known that I, JAMES EDWARD BERING, a citizen of the United States, residing at Decatur, in the county of Macon and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to corn-planters of that class or type which can by slight changes be adapted to plant either in check-rows or in drills; and the invention consists in improvements structurally in some parts to adapt them to improved uses and to new combinations, and in combinations hereinafter fully described, and set forth in the claims hereto appended.

Mechanism embodying the structural peculiarities of the different parts and the organization of said parts in combinations and in other combinations forming the subject-matter of my improvements is illustrated in the accompanying drawings, in which—

Figure 1 is a top plan of a planter embodying my improvements; Fig. 2, an enlarged rear elevation of one of the wheel-scrapers, showing its adjustment on the scraper-bar; Fig. 3, a sectional elevation in the line 3 3 in Fig. 1, showing the planter adjusted for planting; Fig. 4, a sectional elevation in same plane as Fig. 3, but showing the planter adjusted for transportation on its own wheels for turning, &c.; Fig. 5, an enlarged sectional elevation in the line 5 5 in Fig. 1; Fig. 6, a rear elevation, enlarged, of the seed-tube and some adjacent parts; Fig. 7, a sectional plan in the line 7 7 in Fig. 5; Fig. 8, an enlarged top plan of parts of the right-hand side of the machine, partly broken away; Fig. 9, a sectional elevation in line 9 9 in Fig. 8.

Referring to the parts by letters, the same letter indicating the same part in the different figures of the drawings, A is the rear frame of the planter, and B the forward frame. The rear frame consists of side bars $a$, transverse bars $a'$ $a^2$ $a^3$, and axle $a^4$, which are preferably of tubular metal, as shown, and of suitable braces $a^5$. The wheels C, which support the rear frame A, are adjustable on the axle $a^4$, for purposes hereinafter described. The forward frame B is formed of transverse bars $b$, which are preferably tubular metal bars, and of the runners or seed-receiving furrow-openers D, seed-tubes E, and suitable braces $b'$ $b^2$.

The side bars $a$ of the rear frame extend forwardly some distance in front of the rear part of the forward frame to where they are pivoted to the forward frame at such points as that when the forward frame is supported on the raised forward end of the tilted rear frame in an ordinary manner the forward frame will be substantially balanced on said pivots and be thereby so nearly entirely supported by the rear frame as to prevent any part of its weight being supported on the necks of the draft-animals through the tongue $b^3$, which is fixed to the forward frame. Removable pieces $b^4$ are fixed by bolts $b^5$ in the forward ends of the side bars $a$, and a slotted bracket $b^6$ extends upwardly from each piece $b^4$ and receives a lug $b^7$, which is carried by a bar $b^8$, that is fixed to a frame-bar $b$ and brace $b'$, thus forming a pivotal or hinged connection between the front and rear frames, which permits of either frame swinging in a vertical plane on and in relation to the other frame, except when the lock-lever (hereinafter described) is locked to fix said frames in relation to each other, and then the slot in the bracket $b^6$ forms a sliding pivot on the lug $b^7$ to permit of a limited flexure between said frames in an evident manner.

The lever G is pivoted at $g$ to the upper part of a block $g'$, which is bolted to the bars $a'$ $a^2$, and which block carries a concave rack-bar $g^2$, having teeth $g^3$, with which the spring-dog $g^4$, carried by the lever G and operated by the thumb-lever $g^5$, engages. An arm $g^6$ projects laterally from the lever G and is pivotally connected by a bar-link $g^7$ with a projection $g^8$, which is fixed to the rear end of the tongue. By means of the lock-lever described the forward frame B can be raised and lowered and locked in various relations to the rear frame and to the surface of the ground either for operation in the field, as shown at Fig. 3, or for carriage of both frames on the wheels C, as shown at Fig. 4, and when so locked the slotted hinge connection $b^6$ $b^7$ between them will permit of limited upward and downward movement of the forward frame to facilitate the passage of the runners in uneven surface and quality of the soil and over obstructions and for other purposes. When desired to have complete freedom of flexure between the forward and rear frames, the thumb-lever $g^5$ can be engaged with the catch-link $g^{10}$ to hold the dog $g^4$ out of contact with the teeth $g^3$, and thus allow the lever G to swing freely.

The scrapers H are journaled one on each end of the bar $a^3$, and from a pivot-pin $h$ on each scraper a link-rod $h'$ extends forward to a foot-lever $h^2$, which is pivoted on the extended end of the frame-bar $a^2$. The driver from his seat I can operate either scraper independently of the other by forcing its lever $h^2$ forward with his foot, and when pressure is removed from said lever the gravity of the scraper will swing it out of contact with the wheel-tire. The scrapers are held in place lengthwise of the bars $a^3$, while permitted to swing thereon toward and from the wheels, each by a block $h^3$, which is fixed on the bar $a^3$ by a bolt $h^4$, and has a groove $h^5$, which receives a corresponding ledge $h^6$ on the journaled parts of the scraper, as shown at Fig. 2, for the purposes described. The blocks $h^3$ each have a slot $h^7$, through which the bolt $h^4$ passes, whereby each block may be adjusted in an evident manner lengthwise of the bar $a^3$ and be fixed after such adjustment by the bolt $h^4$. In this manner the scrapers may be adjusted to suit the different distances between the planter-wheels C, when said wheels are adjusted laterally on the axle $a^4$, to adapt them to adjustments of the distances between the runners for planting in rows at different distances apart.

The wheels C are each adjusted and fixed after adjustment on the axle $a^4$ by means of pins $c'$, which pass through notches $c^2$ in a sleeve-journal $c^5$ for the hub $c^3$ of said wheel and through either of the series of holes $c^4$ in the axle. The bars $b^9$, which are fixed to the runners and seed-tubes and which carry the seed-boxes E', are fixed at their rear ends to the rear one of the frame-bars $b$ by bolts $e$, which pass through said bars $b^9$ and through a series of holes $e'$ in said frame-bar $b$ for the purpose of adjusting and fixing the distances between the seed-boxes and the rear ends of the runners. The forward ends of the runners are adjustable on the forward one of the bars $b$ by means of clips $e^2$, which receive said bar $b$, and are bolted to the bars $b^9$. The braces $b'$, being fixed as they are to the bars $b$ $b$, do not change their distances apart in the adjustments of the runners and seed-boxes laterally of the planter, and the side bars $a$ of the rear frame are likewise fixed to the axle and transverse bars of the rear frame, so that the distances between said bars $a$ are unchanged by the lateral adjustment of the wheels C on the rear frame, and hence the hinge connection of the front and rear frames A B does not require any changing or adjustment when the adjustments hereinbefore described are made for planting at different distances apart.

The seed-boxes E' are each provided with ordinary dropping mechanism consisting of a circular disk J, with a series of seed-cups $j$, concentric with its axis of rotation, which seed-cups in succession pass beneath a cut-off $j'$, each to discharge its contained seed into the seed-tube E through an orifice $j^2$ in the seed-box bottom. A cap $j^4$ partly covers the seed-cup disk and carries the cut-off $j'$. The seed-cup disks J are rotated in an ordinary manner by means of a bevel gear-pinion $k$, fixed on each end of a shaft K, one of which pinions $k$ gears with a series of beveled teeth $j^5$ on each disk J. (See Figs. 5 and 8.) The shaft K is rotated by means of gear connection with one of the wheels C, to which is fixed a sprocket-wheel $k'$, that is geared by a chain belt $k^2$ with a sprocket-wheel $k^3$, the hub or boss $k^4$ of which engages as an ordinary clutch with the boss $k^5$ of the pinion $k$, whereby the seed-cup disk J will be continuously rotated by the rotation of the wheel C with which it is in gear. The hub $k^4$ slides freely on and lengthwise of the shaft K, but is held to rotate with said shaft by a spline and seat $k^7$, and also has a groove $k^6$, in which an arm L rests. The arm L projects from a sleeve $l$, that is mounted to slide on the rear shaft $b$. The sliding sleeve $l$ is, as shown, pivotally connected by a link-rod $l'$ with a crank $l^2$, which is pivoted to the rear bar $b$, and has a handle $l^3$, by which the driver can with his hand or foot turn said crank into the position shown by full lines at Fig. 8 to throw the clutch member $k^4$ into gear with the member $k^5$ or turn it in an opposite direction, as shown by dotted lines at same figure, to disengage said members of the clutch. When the crank $l^2$ is turned into either of the positions described, its handle $l^3$ will rest on the bar $b$ and lock and hold said clutch members engaged with each other until released by turning said crank, as described. Pivoted to the sleeve $l$ is an arm $m$, (see Figs. 8 and 9,) which carries a pulley $m'$, on which the upper part of the belt is sustained out of contact with other parts and for other purposes hereinafter described. If preferred, the arm $m$ may be turned over into the position shown at Fig. 9 by dotted lines. The hinge connection between the front and rear frames is so nearly at same distance from axle or fulcrum on which the rear frame swings as is the forward part of the chain belt $k^2$ that in flexing said frames in the operations of the planter the chain belt is not slackened more than will be taken up by the pulley $m'$ and arm $m$, as will be evident from the illustration of such operation at Fig. 4.

The seed measuring and discharging devices hereinbefore specifically described are operated entirely by force derived from the draft-animals, and the relative speed of the seed-cup disks J to the rotations and travel of the wheel C, which drives them, is controlled by the relative number of teeth in the sprocket-wheels $k'$ and $k^3$. The sprocket-wheels referred to are so proportioned to the seed-cup disks that their seed-cups will successionally discharge their seed at about the proper distances apart for drilled planting, each seed-cup being of a size preferably to contain from one to two grains of corn, as is desirable in each deposit of seed in planting in drills; and I will now proceed to describe the means embodied in my improvements for receiving the seed from said seed-drilling mechanism and for discharging it from the seed-tubes periodically and in quantities suitable for planting in "hills" at predetermined distances apart and in check-rows or rows transversely of the rows coincident with the paths of the planter.

The bar P, fixed to the forward frame of the planter and provided with heads $p$, pulleys $p'$, guard $p^2$, and journal-bearings for the rock-shaft Q, which has a forked lever R, loosely mounted on each of its ends, and stop-blocks $r$, against which said forked levers each respectively act to oscillate the shaft Q, while the other forked lever is at rest, are parts of a well-known construction of corn-planter check-rower mechanism in which the rock-shaft is adapted to receive motion in one direction in the ordinary manner from contact of a forked lever with tappets or dropping-indices $s$ on a wire or check-row chain S, which is stretched coincident with the rows of plants and travel of the planter, and in the other direction by a retractile spring $t$, which acts on an arm $t'$, which projects from the rock-shaft.

V is a lever pivoted at $v$ near its mid-length portion to projections $v'$ from the rear side of each seed-tube. The lower end of each lever V carries a valve V', which is preferably an integrant part of said lever and which has a seat on the lower sloping discharge end $e^3$ of the seed-tube, which it is adapted to close as a flap-valve. Between its pivot-point $v$ and upper end the lever V carries another valve $V^2$, which projects laterally therefrom and is fitted to close and cut off passage through the seed-tube, as a gate-valve, by entering the seed-tube through an orifice $e^4$ in its rear side, through which orifice it is adapted to act by its curved form, as shown at Figs. 5 and 7. The upper end of the lever V is pivotally connected with one end of a link-rod $w$, the other end of which is pivotally connected with the outer end of a crank-arm $w'$, which is fixed to the rock-shaft Q. The link $w$ is adjustable in length, as shown. As the planter moves forward in operation, the forked lever coming in contact with a tappet or dropping-index $s$ will be swung rearwardly and will give a partial rotation to the rock-shaft Q in the ordinary manner, and in such movement of the rock-shaft the lower end of the crank-arm $w'$ will be swung forwardly and by means of the link $w$ will swing the upper end of the lever V toward the seed-tube, and thereby close or insert the valve $V^2$ into the seed-tube, and at the same time open or remove the valve V' from the lower discharge end of the seed-tube. This last-described operation of the forked lever, rock-shaft, and valve-gear intermediate therewith and with the valves V' and $V^2$ is shown by dotted lines at Fig. 5. When the forked lever is released from the tappet $s$ by the forward movement of the planter and the retractile spring $t$ returns the forked lever to its normal position, (shown by full lines in the drawings,) the reverse movement of the rock-shaft to that last described will move the valve-gear and the valves V' $V^2$ into the respective positions, (shown by full lines at Fig. 5,) and thereby open the valve $V^2$ and close the valve V'.

From the foregoing it will be seen that the devices for measuring the charges of seed, separating them from the quantity contained in the seed-box, and delivering it to the seed-tube are operated by gear connection with one of the wheels C, while the valves V' $V^2$ in the seed-tubes are operated by gear connection with the forked levers that are operated, respectively, by the check-row chain and by the retractile spring.

The small charges of seed as they are delivered to the seed-tube from and by the seed-cup disk will be received on the valve V', which is so timed with reference to said charges that it will have enough of such charges of seed for a hill of corn, when the valve V' will be opened by a forked lever swinging rearwardly from contact with a tappet $s$ and the seed contained above it be thereby discharged into the heel of the runner for deposit in the soil.

Without the valve $V^2$ a charge of seed may be delivered from the seed-cup disk, while the valve V' is open or just opening, and seed be thereby scattered and dropped out of place between the designated deposits thereof. The valve $V^2$ will entirely prevent such dribbling of the seed arising from its delivery to the valve V' at improper times, as the valve $V^2$ is closed at the instant the valve V' opens, and will receive all seed delivered from above it until the valve V' is again closed, at which instant the valve $V^2$ opens, drops to the valve V' what seed it may have received, and remains open until the valve V' again opens, when the valve $V^2$ again closes, as described. These relative movements of the valves V' $V^2$ are positive and not liable to any disturbance, as both valves are carried by and rigidly fixed to the lever V. The link $w$ can be adjusted in length, as shown, to compensate for wear of the valves V' $V^2$ or for other purposes.

It will be evident that the valves V' $V^2$ and lever V, with their valve-gear, can be used in seed-tubes which receive seed from seed measuring and delivering valves in the seed-box of different types from that I have shown and described and that such mechanism in the seed-box may be operated from the wheel differently from what I have shown without any departure from that part of my invention, the gist of which is not limited to any particular seed-delivering mechanism in the seed-box nor to any specific gear connection between such mechanism and the planter wheel or wheels.

When it is desired to use the planter for planting in drills, it is not necessary to remove the entire check-rowing mechanism, but simply to remove the lever V, with its valves V' and V² and dispense with the check-row chain, when the seed will be dropped, as hereinbefore described, from the seed-cup disk through the tube and runner to the soil and deposited therein in drills or at short distances apart.

What I claim as new is—

1. In a check-row corn-planter, in combination, substantially as hereinbefore described, a seed-tube and a lever pivoted or hinged thereto and in rear thereof, a valve fixed to said lever above its pivotal point and adapted to act as a gate-valve through an opening in the rear side of the seed-tube, and a valve fixed to said lever below its pivotal point and adapted to act as a flap-valve to open and close the seed-discharging end of the seed-tube, substantially as described.

2. In combination, in a corn-planter, a seed-tube, a lever pivoted or hinged thereto, a valve fixed to said lever above its hinge to the seed-tube and adapted to act as a gate-valve through an opening in the rear side of the seed-tube, a valve fixed to said lever below its hinge to the seed-tube and adapted to act as a flap-valve to open and close the lower end of the seed-tube, and a link and crank-arm connecting said lever with a rock-shaft having a forked lever for rocking it in one direction and a spring for rocking it in a reverse direction, the forked lever receiving motion from a check-row chain, substantially as described.

3. In a corn-planter, in combination with a seed-tube, a seed-measurer in the seed-box, actuated by gear connection with the planter wheel or wheels for delivering seed to said tube in measured quantities, a lever hinged to the seed-tube and provided with valves V' and V², geared directly by means of a link $w$ and crank-arm $w'$ with a rock-shaft which carries forked levers that are actuated, respectively, by a check-row chain to swing the rock-shaft in one direction and a spring for swinging it in an opposite direction, substantially as described.

4. In a corn-planter, in combination with a seed-tube E, having orifice $e^4$ and sloping lower end $e^3$, and the lever V, carrying alternately-acting valves V' V², substantially as described.

5. In a corn-planter, in combination with a seed-tube E, having orifice $e^4$ and valve-seat $e^3$, the lever V, carrying valves V' V², rod $w$, arm $w'$, rock-shaft Q, forked lever R, spring $t$, and check-row chain S, substantially as described.

6. In a corn-planter, in combination with a seed-tube E, having orifice $e^4$ and valve-seat $e^3$, a lever V, carrying valves V' V², rod $w$, arm $w'$, rock-shaft Q, forked lever R, spring $t$, check-row chain S, and a seed-cup disk J, adapted to deliver charges of seed to said seed-tube and actuated by gear connection with the planter wheel or wheels, substantially as described.

7. In a corn-planter, in combination with a rear frame having side frame-bars $a$, with slotted brackets $b^6$ at their forward ends, a forward frame having bars $b^8$, with pivots $b^7$, to which the slotted brackets $b^6$ are hinged, and a lever by means of which the forward and rear frames are locked together, substantially as described.

8. In a corn-planter, in combination with a rear frame, side frame-bars $a$, extended forwardly and provided at their forward ends with slotted brackets $b^6$, a forward frame having bars $b^8$, with pivots $b^7$, located centrally of the forward frame to which the slotted brackets $b^6$ are hinged, and a lever by means of which the forward and rear frames are locked together, substantially as described.

9. In a corn-planter rear frame of tubular iron, in combination, an axle $a^4$, with wheels C, adjustable thereon, substantially as described, side bars $a$, unadjustably fixed to said axle and connected unadjustably by transverse bars $a'$ $a^2$ $a^3$, and wheel-scrapers H, adjustable on the bar $a^3$ to correspond with the adjustment of the wheels by means of a block $h^3$, with slot $h^7$, through which a bolt $h^4$ passes, and with a groove $h^5$, seated over a flange $h^6$ on the scraper-shank, substantially as described.

10. In a corn-planter, a forward and a rear frame of tubular iron, having wheels, runners, and seed-boxes laterally adjustable thereon, and wheel-scrapers journaled on the rear frame-bar and adjustable coincidently with the planter-wheels and held after such adjustment, substantially as described, by slotted blocks $h^3$, having grooves $h^5$, fitting over flanges $h^6$ on the scraper-shanks, substantially as described.

11. In a corn-planter, in combination with one of the transverse frame-bars thereof, a wheel-scraper H, journaled on said frame-bar and held from movement lengthwise thereof by a block $h^3$, with slot $h^7$, through which a bolt $h^4$ passes, and with a groove $h^5$, seated over a flange $h^6$ on the scraper-shank, substantially as described.

In testimony whereof I affix my signature in presence of two witnesses.

JAMES EDWARD BERING.

Witnesses:
J. FRANK DAVIS,
R. J. SIMPSON.